B. H. ROSE
MEANS FOR STACKING TIRE MOLDS
APPLICATION FILED MAR. 24, 1919.
1,338,844.
Patented May 4, 1920.
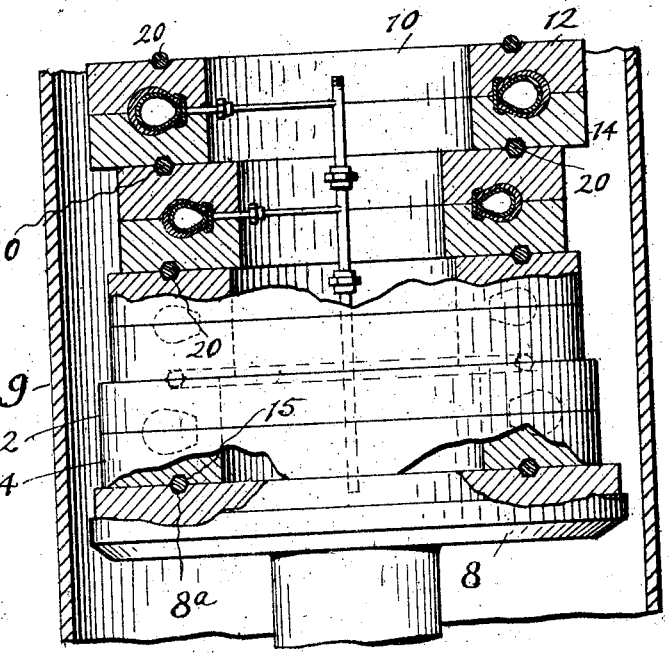
Fig. 1.
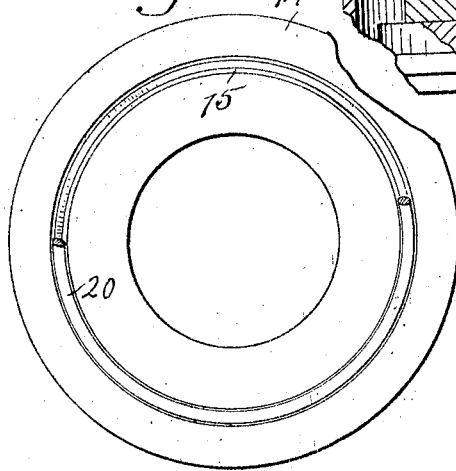
Fig. 4.
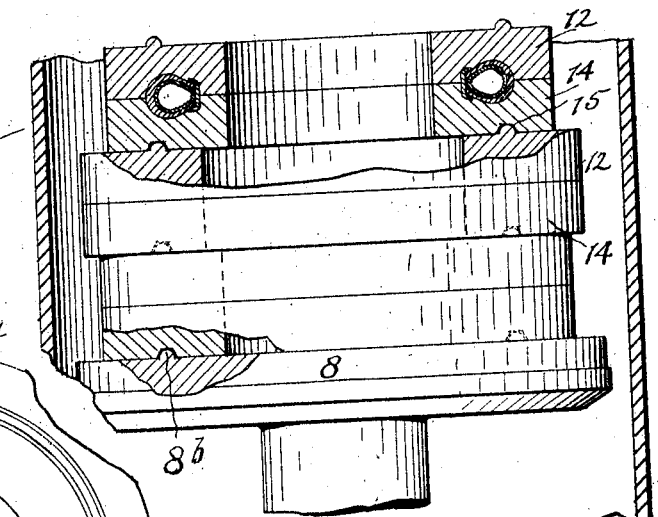
Fig. 3.
Fig. 2.
Inventor
Benjamin H. Rose
by Thurston Kwis & Hudson
Attorneys

UNITED STATES PATENT OFFICE.

BENJAMIN H. ROSE, OF LAKEWOOD, OHIO.

MEANS FOR STACKING TIRE-MOLDS.

1,338,844.  Specification of Letters Patent.  Patented May 4, 1920.

Application filed March 24, 1919. Serial No. 284,801.

*To all whom it may concern:*

Be it known that I, BENJAMIN H. ROSE, a citizen of the United States, residing at Lakewood, in the county of Cuyahoga and State of Ohio, have invented a certain new and useful Improvement in Means for Stacking Tire-Molds, of which the following is a full, clear, and exact description.

It is quite common, in vulcanizing certain kinds of rubber tire casings, to proceed in the following manner:

Each green tire casing is placed in the mold cavity in the lower half of a two-part annular mold. Then the upper part of said mold, which contains a part of the tire cavity, is put on. A deflated air tube is put into each tire casing, and the valve stem thereof projects out of the annular mold toward the axis thereof. The filled molds are then stacked one upon another upon the ram head of a heater press. As the molds are put in the heater press, connections are made between a pipe line and the respective valve stems in order that the air tubes may be inflated. The cover of the heater press is then put on, thereby closing it. The molds in a stack are then clamped together between the cover of the press and the vertically movable ram upon which the stack of molds is supported; the air tubes are then inflated; and steam is let into the then closed heater press.

The labor cost of making the connections with the air tubes is high, and the pipes through which these connections are made are very short lived. Both of these disadvantages of the common practice is due in a large degree, as I believe, to the fact that the molds as they are stacked in the heater press are not arranged concentrically one upon another. In fact, the molds as they have heretofore been constructed have not been provided with or associated with means for accurately centering the molds of a stack. In my prior application No. 278,193, filed Feb. 20, 1919, the several molds shown are so formed as to facilitate the accurately concentric disposition of the molds in a stack. But the molds shown in this application are all of the same diameter and the specific centering means, as shown, can be employed only for centering molds of the same diameter. It frequently happens, however, that in actual practice, it is necessary to include molds of different diameters in the same stack in the heater press. The present invention relates to means whereby, under all circumstances, the molds whether of the same or of different diameters, may be easily and accurately arranged in the desired concentric relation.

The invention consists in the construction and combination of parts shown in the drawing and hereinafter described as set forth in the appended claims.

In the drawing, Figure 1 is a central sectional view of a stack of coöperating molds arranged in a heater press, all constructed to embody the present invention in what I believe to be its best form. Fig. 2 is a similar central sectional view of a modified construction; Fig. 3 is a plan view of a mold having the annular groove in the top surface thereof. Fig. 4 is an enlarged sectional view of the device.

Referring to the parts by reference characters, 9 represents the heater press; and 8 the head of the vertically movable ram, which supports the stack of molds in the heater press. 10—10 represents annular tire molds. Each mold consists of an annular top member 12, an annular bottom member 14, and in the meeting faces of these two mold sections is the annular recess for the reception of a tire casing; and between these meeting faces is also the radial groove through which the valve stem of the air bag within the inclosed tire casing may project. In the particular kind above referred to the molds are of conventional form.

In the engaging faces of the stacked molds and supporting ram head are centering recesses which are arranged in like relation to the axes of the molds regardless of the diameter of the molds. In the embodiment of the invention shown, these recesses are annular grooves which are concentric with the axes of the molds, and they are all of the same diameter regardless of the diameter of the annular molds. The annular grooves in the engaging faces of the molds are indicated by 15, and the annular groove in the top surface of the ram head is indicated by 8ᵃ. Preferably each groove, in cross section, is half of a hexagon.

20, 20, represent centering rings which are preferably cylindrical in cross section; and each is of such diameter that it will fit the above mentioned groove. In stacking a lot of molds constructed as stated this ring will be put into the groove in the top surface of the ram head or the mold therein upon which another mold is to be stacked. A mold will then be placed upon this mold in such position that the groove in its lower surface will engage this ring, and, therefore, will accurately center this mold with respect to the mold or ram head which supports it; the bevel sides of the hexagonal groove serving to help the centering movement.

This method of procedure will be followed until the stack is as high as desired. By so concentrically arranging the mold with respect to one another in a heater press, and by also arranging the lower mold in an exact position upon the ram head within said heater press, all of the valve stems will come to occupy positions which are equidistant from the axis of the stack. This will make it easy to connect each valve stem with an axially disposed main air supply pipe. It will also permit the use of connections of standard lengths between the central air pipe and the various valve stems. It is not meant that all of these connections are necessarily of exactly the same length, but it is meant that there will be substantially standard lengths for use in connection with the valve stems of molds of various diameters. It would perhaps be too much to claim that the exact distance between the central air pipe and each valve stem of molds of the same size will be exactly the same, but the variations will be very slight, and therefore little bending or twisting or lengthening or shortening of the connections between the central supply pipe and the valve stem will be required.

In the modified construction shown in Fig. 2 each bottom mold section is formed with the annular groove and all of these annular grooves are concentric and of the same diameter, regardless of the diameter of the molds. Each upper mold section is formed with an annular upwardly projecting ring,— said rings being all of such diameter that the ring of each mold will fit into the groove of any other mold placed upon it, and will cause the centering of said molds with respect to one another.

Having described my invention, I claim:

1. The combination of a heater press, and its ram head, with a plurality of tire molds supported upon said ram head and stacked one upon another, the engaging upper surface of the ram head and the upper and lower surfaces of the molds being formed with concentric annular grooves of the same diameter, and centering rings which lie in and are fitted to the annular recess formed by the annular grooves in said engaging surfaces.

2. The combination of a stack of concentrically disposed annular tire molds supported one upon another, the engaging upper and lower surfaces of said molds being formed with concentric annular grooves of the same diameter, and centering rings which lie in and fit the annular recesses formed by the annular grooves in the engaging surfaces of said molds.

3. The combination of a plurality of concentrically arranged annular tire molds which are supported upon one another, all of said molds having in their corresponding engaging surfaces annular concentric grooves all of the same diameter, and centering rings of the same diameter adapted to lie in and fitted to said grooves, and means for causing each ring to maintain a concentric connection with that face of a mold which engages the surface of a mold in which is the groove in which said ring lies.

4. An annular tire mold, comprising separable upper and lower halves, having when the two parts are together substantially parallel upper and lower outside surfaces which are normal to the axis of the annular mold; said upper and lower outside surfaces being formed with annular grooves which are concentric and of the same diameter.

In testimony whereof I hereunto affix my signature.

BENJAMIN H. ROSE.